United States Patent
Ikeda

(10) Patent No.: US 10,011,109 B2
(45) Date of Patent: Jul. 3, 2018

(54) IMAGE FORMING APPARATUS, NON-TRANSITORY COMPUTER READABLE MEDIUM, AND IMAGE FORMING METHOD

(71) Applicant: FUJI XEROX CO., LTD., Tokyo (JP)

(72) Inventor: Kentaro Ikeda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/366,415

(22) Filed: Dec. 1, 2016

(65) Prior Publication Data
US 2017/0334199 A1 Nov. 23, 2017

(30) Foreign Application Priority Data
May 23, 2016 (JP) .................. 2016-102590

(51) Int. Cl.
*B41J 2/045* (2006.01)
*G06K 15/10* (2006.01)

(52) U.S. Cl.
CPC ........ *B41J 2/04536* (2013.01); *G06K 15/102* (2013.01); *G06K 2215/0094* (2013.01); *G06K 2215/101* (2013.01)

(58) Field of Classification Search
CPC ...... B41J 29/38; B41J 29/393; B41J 2/04536; G06K 15/102; G06K 15/02; G06K 15/1805; G06K 2215/0094; G06K 15/027; G06K 2215/101
USPC .................. 347/5, 14, 19; 101/483
See application file for complete search history.

(56) References Cited

U.S. PATENT DOCUMENTS

2015/0178602 A1* 6/2015 Kusakabe .......... G06K 15/1805
358/1.15

FOREIGN PATENT DOCUMENTS

JP         06-000960 B2      10/2016

\* cited by examiner

*Primary Examiner* — Jannelle M Lebron
(74) *Attorney, Agent, or Firm* — Oliff PLC

(57) ABSTRACT

An image forming apparatus includes a drawing data creating unit and a controller. The drawing data creating unit creates drawing data from a print job. The controller automatically sets at least one of a first dropping method of performing discharge in a drawing area and a second dropping method of performing the discharge outside the drawing area as a preliminary discharge method in accordance with a type of component elements of the created drawing data, and performs preliminary discharge in accordance with the set preliminary discharge method.

11 Claims, 10 Drawing Sheets

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2016-102590 filed May 23, 2016.

BACKGROUND (i) Technical Field

The present invention relates to an image forming apparatus, a non-transitory computer readable medium, and an image forming method.

(ii) Related Art

In an inkjet printer, nozzle clogging occurs owing to drying and increase in viscosity of ink disused for an extended time. Therefore, preliminary discharge is performed which discharges ink independently of printing to clear the nozzle clogging.

An inkjet printer mostly for personal or home use performs printing while moving a print head, and thus is capable of performing the preliminary discharge in an area where a recording medium is absent. Meanwhile, a large single-pass printer with a line head, particularly a large business-use inkjet printer using a rolled sheet, performs printing on a sheet uninterruptedly without feeding any other blank sheet during the printing, and thus is incapable of performing the preliminary discharge in an area where a recording medium is absent, and needs perform the preliminary discharge on the recording medium.

Therefore, there have been proposed line dropping of preliminarily discharging ink in lines onto a head portion of a sheet and random dropping of preliminarily discharging ink at random over the entire surface of a sheet, which are performed in certain sheet printing units.

FIGS. 11A and 11B schematically illustrate the line dropping and the random dropping. FIG. 11A illustrates line drops 102 preliminarily discharged in lines onto a head portion of a sheet 100. If cyan (C), magenta (M), yellow (Y), and black (K) are used as process colors, the line drops 102 are preliminarily discharged in lines for the respective process colors. Meanwhile, FIG. 11B illustrates random drops 104 preliminarily discharged at random over the entire surface of a sheet In both of the drawings, different hatching patterns indicate different colors.

SUMMARY

According to an aspect of the invention, there is provided an image forming apparatus including a drawing data creating unit and a controller. The drawing data creating unit creates drawing data from a print job. The controller automatically sets at least one of a first dropping method of performing discharge in a drawing area and a second dropping method of performing the discharge outside the drawing area as a preliminary discharge method in accordance with a type of component elements of the created drawing data, and performs preliminary discharge in accordance with the set preliminary discharge method.

BRIEF DESCRIPTION OF THE DRAWINGS

Exemplary embodiments of the present invention will be described in detail based on the following figures, wherein.

DETAILED DESCRIPTION

Figure 1:
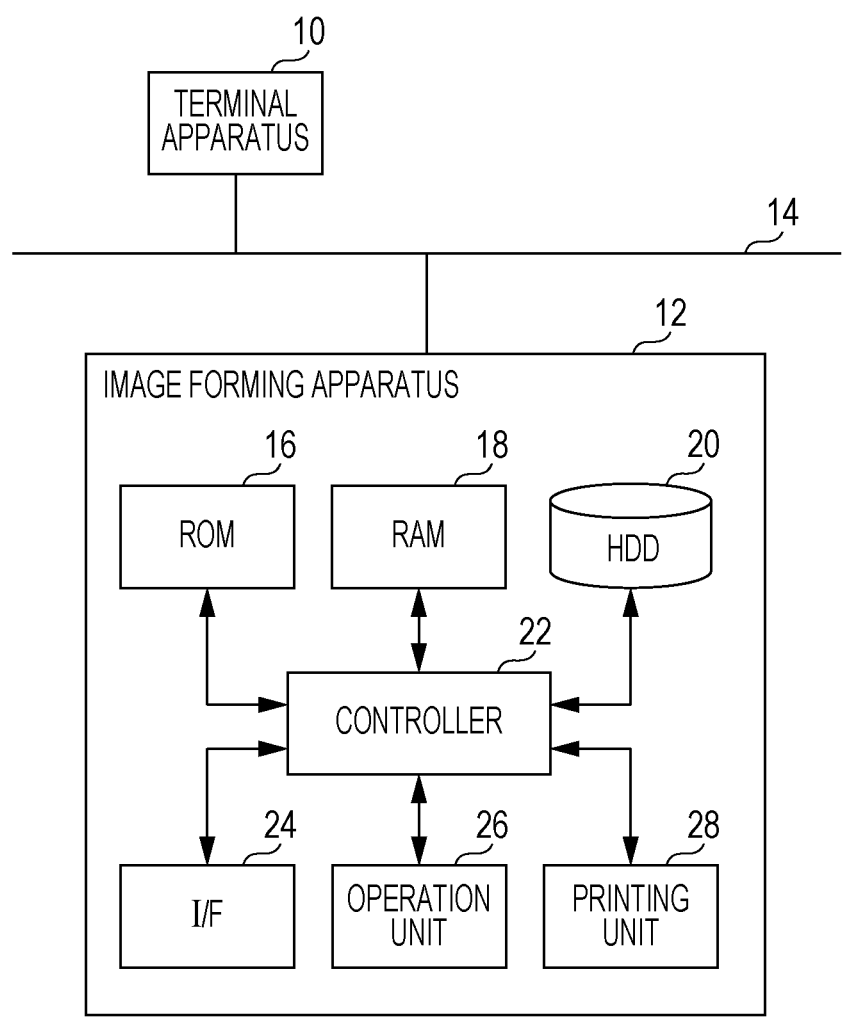
FIG. 1 is a system configuration diagram of an exemplary embodiment.

An exemplary embodiment of the present invention will be described below with reference to drawings.

Fundamental Principle

A fundamental principle of the present exemplary embodiment will first be described.

A preliminary discharge method may broadly be divided into a first dropping method of discharging ink in a drawing area in which drawing data is printed and a second dropping method of discharging ink outside the drawing area. A typical example of the first dropping method is random dropping of discharging ink at random in the drawing area. A typical example of the second dropping method is line dropping of discharging ink in lines outside the drawing area. When the ink is preliminarily discharged in the drawing area in which the drawing data is printed, it is necessary to set the density of the ink to a visually unnoticeable level, and the ink is discharged at random (random dropping) in a thin, dispersed manner to make it difficult to visually notice ink drops. When the ink preliminarily discharged outside the drawing area, on the other hand, the ink is discharged in lines (line dropping) to be collectively discharged in a narrow area to reduce the space between sheets or to use the space between sheets for a purpose other than the preliminary discharge (such as to use the space between sheets as an area for forming marks for adjusting the density or position, for example) when visually noticeable ink drops are acceptable. Each of these methods has favorable and unfavorable characteristics. The line dropping is favorable in ejecting the ink from all nozzles onto the head of a page, which allows the portion subjected to the preliminary discharge to be cut off in a later step as not to remain in a printed material, and in not affecting a print job. However, some of the nozzles may eject the ink only at page intervals depending on the nozzle position or the print job, and thus may clog despite the execution of the preliminary discharge. The line dropping is therefore suitable for a page with a high proportion of images such as photos or graphics. The random dropping is favorable in reducing ink consumption by performing control for each of heads of the respective colors and for each of the nozzles. Since each of the colors is controlled independently, however, there may arise smearing or deviation from the original color tone, such as a skin color portion covered with black (K) random drops or a solid portion of a given color mixed with another color, for example. The random dropping is therefore suitable for a text portion with no change in color.

In the present exemplary embodiment, with these characteristics taken into account, the preliminary discharge method is set to automatically switch in accordance with the contents of the print job, to thereby maintain the print quality while suppressing the nozzle clogging.

That is, basically, in the present exemplary embodiment, it is determined, for each of processing units, whether component elements of the processing unit are text or graphics. Then, if the component elements of the processing unit are text, the random dropping is automatically set as the preliminary discharge method for the processing unit. If the component elements of the processing unit are graphics, the line dropping is automatically set as the preliminary discharge method for the processing unit. component elements, an optimal preliminary discharge method is automatically set in accordance with the ratio between text and graphics, thereby reducing cost and work of a user.

For example, if the same print job is printed at a sheet transport speed of 50 m/min and at a sheet transport speed of 100 m/min, respectively, when the line dropping is set, the interval of ink discharge from a given one of the nozzles in the sheet transport at 50 m/min is twice that in the sheet transport at 100 m/min, and thus the nozzle clogging is twice more likely to occur in the sheet transport at 50 m/min than in the sheet transport at 100m/min. In the present exemplary embodiment, therefore, if the line dropping is set and there is a possibility of the nozzle clogging in light of the sheet transport speed, the line dropping and the random dropping are combined, or an alert is issued to suggest increasing the sheet transport speed. Thereby, the incidence of the nozzle clogging is reduced when the line dropping is set.

Whether to employ the combined method of the line dropping and the random dropping or to issue the alert to suggest increasing tine sheet transport speed while maintaining the line dropping may be determined based on whether or not to give priority to the color tone, for example. If priority is not given to the color tone, the line dropping and the random dropping may be combined. If priority is given to the color tone, the alert may be issued to suggest increasing the sheet transport speed while maintaining the line dropping. The random dropping is not introduced when priority is given to the color tone, since the original color tone may be lost by the random dropping.

The present exemplary embodiment will now be specifically described.

FIG. 1 is a functional block diagram of a system including an image forming apparatus of the present exemplary embodiment. The system includes a terminal apparatus 10 and an image forming apparatus 12. The terminal apparatus 10 and the image forming apparatus 12 are connected via a communication unit 14. A data communication network, such as a local area network (LAN), for example, is used as the communication unit 14.

The terminal apparatus 10 is connected to the image forming apparatus 12 via the communication unit 14, and transmits a print job containing a command to print a document in accordance with an instruction from a user.

The image forming apparatus 12 includes a read-only memory (ROM) 16, a random access memory (RAM) 18, a hard disk drive (HDD) 20, a controller 22 configured of one or more central processing units (CPUs), an interface (I/F) 24, an operation unit 26 such as a touch panel, and a printing unit 28.

In accordance with a processing program stored in the ROM 16, the controller 22 configured of one or more CPUs receives the command of the print job from the terminal apparatus 10 via the I/F 24, generates intermediate data by interpreting page description language (PDL) data, and further generates drawing data (raster data) from the generated intermediate data. The controller 22 further controls the execution of the preliminary discharge in accordance with the processing program, and controls the printing unit 28 by setting the line dropping and the random dropping to switch to each other adaptively and automatically in accordance with the print job and the printing speed.

The printing unit 28, which has the configuration of a publicly known inkjet system, prints the drawing data on a sheet. The printing unit 28 performs recording on paper, a film, or another material by discharging liquid ink or fusible solid ink from nozzles or the like. Methods of discharging ink include a drop-on-demand method (pressure pulse method) of discharging ink with electrostatic attractive force and a thermal inkjet method of discharging ink with pressure generated by forming and growing air bubbles with high heat. As a recording head, a line head is used which includes a head for discharging cyan ink, a head for discharging magenta ink, a head for discharging yellow ink, and a head for discharging black ink, for example, and in which each of the heads has a width at least equal to the width of the sheet. With the recording head, ink drops of the respective colors are discharged and recorded onto an intermediate transfer body, and thereafter are transferred and printed onto the sheet.

The image forming apparatus 12 includes, as functional modules, a print job receiving module, an interpreting module, a drawing module, and a preliminary discharge setting module. These functional modules are realized when the controller 22 configured of one or more CPUs executes the processing program stored in the ROM 16.

The print job receiving module receives the print job from the terminal apparatus 10. The print job contains the command to print a document and data describing the document to be printed in the PDL. The PDL is a computer programming language for causing an information processor to execute processes such as a display process and a print process. The data described in the PDL includes position information, format information, and color information of objects such as characters, figures, and images forming the document to be printed. The print job receiving module supplies the PDL data contained in the received print job to the interpreting module.

The interpreting module interprets the PDL data acquired from the print job receiving module, and generates and outputs intermediate data, which contains a command representing a procedure of generating the drawing data, in accordance with the result of the interpretation. The drawing data is print image data expressing the image to be printed in a format processable by the printing unit 28, such as raster-formatted data, for example. The intermediate data is data, the granularity of which is intermediate between that of the PDL data and that of the drawing data. The intermediate data format is, for example, a format that expresses the PDL-described image object as subdivided into minute elements of a simple shape. In an example of the intermediate data, an object is expressed by a group of three data items: bounding box specification, color specification, and shape specification. The bounding box specification is information specifying a rectangle containing the object, and includes the coordinates of the upper-left vertex and the lower-right vertex of the rectangle. The color specification is information specifying the color of pixels of the object, and includes information of color format and color data. The color format is information specifying the definition of the color of the pixels of the object, such as single color (all pixels have the same color), gradation (the color changes continuously along the direction in which the pixels are arranged), or raster (the color is individually specified for each of the pixels), for example. The color data is data representing the color of the pixels in the data format according to the color format. In the case of a single color, for example, the color data is a color value expressing one color with coordinates in a color space of basic colors (process colors): cyan (C), magenta (M), yellow (Y), and black (K). In the case of a special color (spot color), the color data is a special color name (the name of the special color). In the case of gradation, the color data includes the information of the initial value and the rate of change of the color. In the case of raster, the color data is data including the color value of each of the pixels. The shape specification is information specifying the shape of the object. The interpreting module generates and supplies the above-described intermediate data to an intermediate data buffer. The intermediate data buffer stores the intermediate data supplied from the interpreting module.

The drawing module reads the intermediate data stored in the intermediate data buffer, and generates the drawing data (raster data) in accordance with the read intermediate data. For example, the drawing module obtains from the color data of the object the value of each of the pixels in the range indicated by the shape specification of the object, and writes the pixel value at the address in a page memory corresponding to the pixel, to thereby draw the object. The drawing module draws all objects included in one page to thereby form a raster image of the page. The generated drawing data items of respective pages are stored in an output buffer, and are sequentially read and supplied to the printing unit 28. The printing unit 28 prints the drawing data items of the respective pages read from the output buffer onto a recording medium such as a rolled sheet.

The preliminary discharge setting module automatically sets the preliminary discharge method of the printing unit 28 with the drawing data generated from the print job and the printing speed. Specifically, the preliminary discharge setting module sets the line dropping and the random dropping to switch to each other in accordance with text, images, or graphics contained in the drawing data, and further sets the line dropping and the combination of the line dropping and the random dropping to switch to each other in accordance with the printing speed.

A description will now be given of a process of setting the preliminary discharge performed by the controller 22.

First Setting Process

Figure 2:
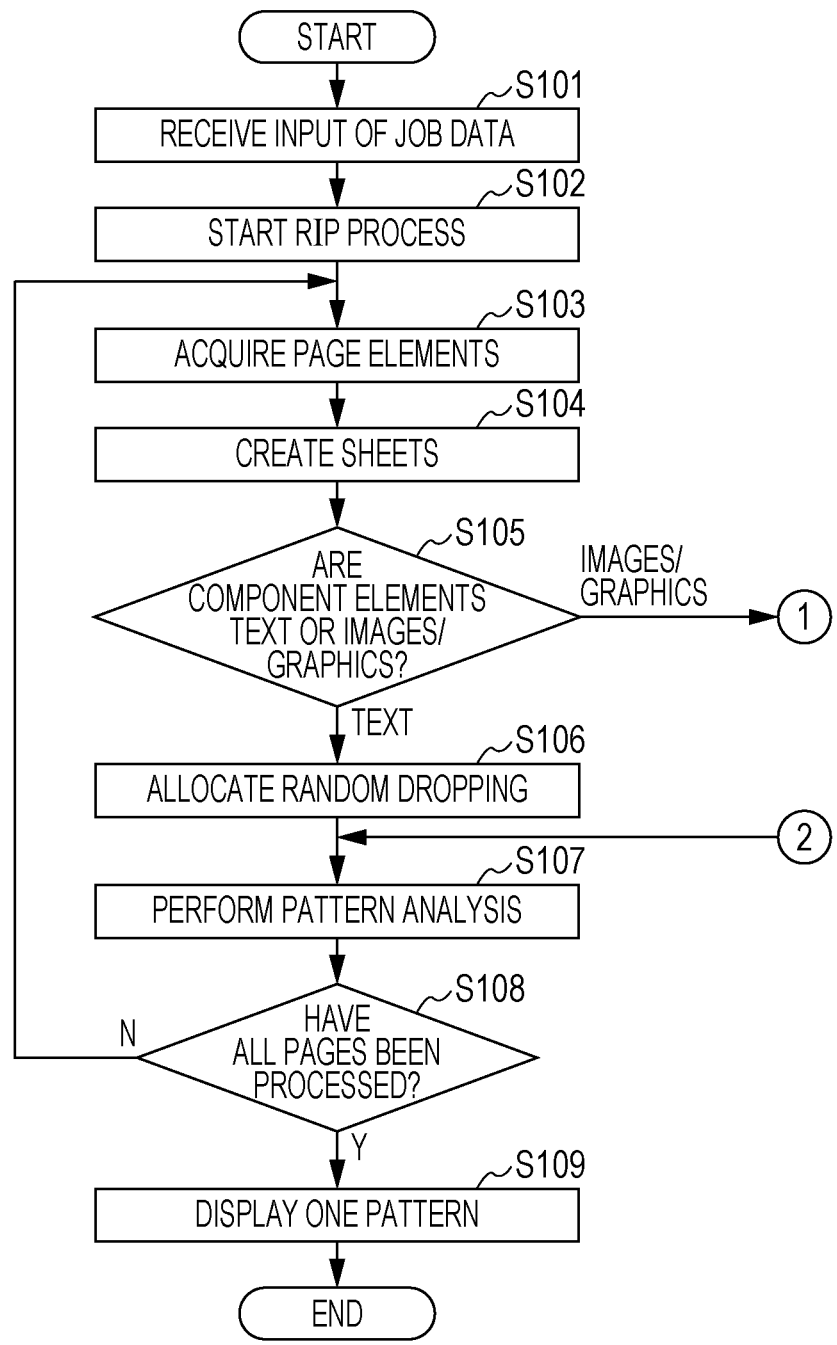
FIG. 2 is a first part of a process flowchart of the exemplary embodiment.
Figure 3:
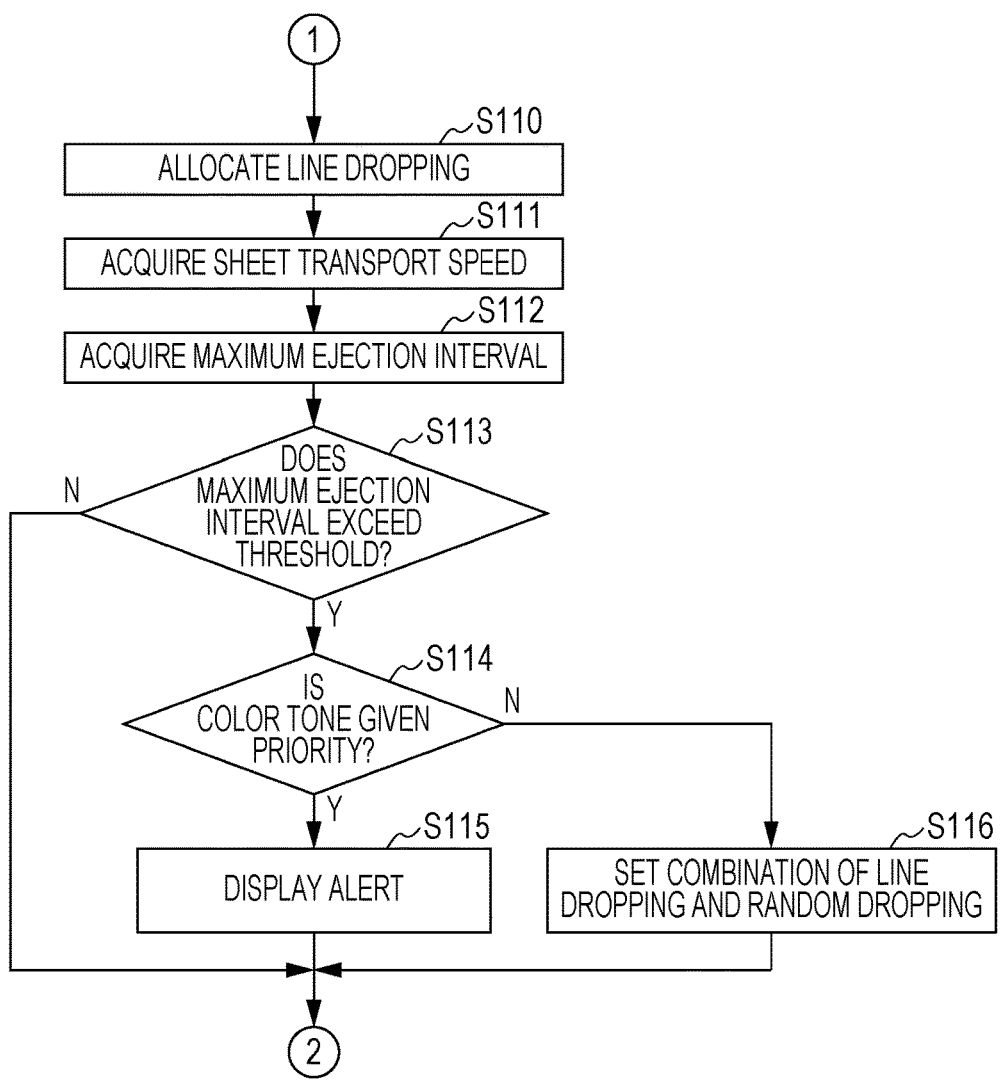
FIG. 3 is a second part of the process flowchart of the exemplary embodiment.

FIGS. 2 and 3 illustrate flowchart of a first setting process of the preliminary discharge performed by the controller 22.

In FIG. 2, the controller 22 first receives the input of the print job data from the terminal apparatus 10 (step S101), generates the intermediate data, and starts generating the drawing data (a raster image processor (RIP) process) (step S102).

The controller 22 then acquires elements (objects) forming pages from the generated drawing data (raster data) (step S103), and creates sheets (step S104). In the case of 2-up printing, for example, one sheet is formed of two pages.

After creating the sheets, the controller 22 determines, in sheet units, whether the component elements of each of the sheets are text or images/graphics (step S105). For example, if one sheet is formed of two pages, the determination of whether the component elements are text or images/graphics is performed on the entire two pages. If the component elements are all text over the two pages, the controller 22 determines the component elements of the sheet as text. If the component elements are all images/graphics over the two pages, the controller 22 determines the component elements of the sheet as images/graphics. Further, if images/graphics are contained in at least one of the two pages, the controller 22 determines the component elements of the sheet as images/graphics by laying weight on the image/graphic portion, even if text forms the remaining portion. In other words, the controller 22 determines the component elements of the sheet as text only if all of the component elements are text, and determines the component elements of the sheet as images/graphics if the sheet contains any images/graphics. Even if the sheet contains images/graphics, however, the controller 22 may determine the component elements of the sheet as text, if the ratio of the images/graphics to the entire sheet is equal to or less than a threshold.

If having determined the component elements of the sheet as text, the controller 22 sets the preliminary discharge method for the sheet by allocating a drop pattern of the random dropping to the sheet (step S106). After setting the random dropping, the controller 22 performs pattern analysis for a user interface (UI) in sheet units (step S107). The controller 22 executes the above-described processes on all of the pages (step S108). If there is any page yet to be processed, the controller 22 repeats the processes of step S103 and subsequent steps. After completing the processes on all of the pages, the controller 22 displays one pattern (one sheet) on the terminal apparatus 10 with the result of the analysis at step S107 to present the pattern to the user (step S109).

Meanwhile, if having determined the component elements the sheet as images/graphics, the controller 22 shifts to the process of FIG. 3.

In FIG. 3, the controller 22 sets the preliminary discharge method for the sheet by allocating a drop pattern of the line dropping to the sheet (step S110). This is because, in the case of images/graphics, the random dropping may change the color tone of the image/graphic portion, and thus it is desirable to perform the preliminary discharge on the head portion of the sheet.

After setting the line dropping for the sheet, the controller 22 further acquires the sheet transport speed of the printing unit 28 (step S111), and calculates the maximum ejection interval for each of C, M, Y, and K plates (planes) with the sheet transport speed (step S112). As to the C plate, for example, the controller 22 performs the preliminary discharge on the head portion of a given sheet, and calculates from the sheet transport speed the ejection interval from the printing of the objects of the given sheet to the preliminary discharge the head portion of the next sheet. If the given sheet does not include any object of the C plate, the maximum ejection interval is equal to the value obtained by dividing a length L of the sheet by a sheet transport speed V. The maximum ejection interval of each of the planes represents a non-discharge time of the plane. The controller 22 compares the non-discharge time of each of the planes with a corresponding threshold of the nozzle clogging, and determines whether or not the non-discharge time exceeds the threshold (step S113).

If the non-discharge time of any of the planes exceeds the threshold, the controller 22 further determines whether or not a color tone priority mode is set (step S114). If the non-discharge time of any of the planes exceeds the threshold, the nozzle clogging is highly likely to occur in the plane. As for this plane, therefore, it is favorable to employ not the line dropping alone but the combined method of the line dropping and the random dropping, which is obtained by adding the random dropping to the line dropping. On the other hand, however, the addition of the random dropping may change the color tone of the images/graphics, as described above. The controller 22 therefore determines whether or not the color tone priority mode is set.

The user is allowed to previously set the color tone priority mode with the terminal apparatus 10. If the color tone priority mode is not set, the controller 22 sets the combined method of the line dropping and the random dropping as the preliminary discharge method for the plane (step S116). For example, if the non-discharge time exceeds the threshold in the C plane but not in the M, Y, and K planes of the C, M, Y, and K planes, the controller 22 sets the combined method of the line dropping and the random dropping for the C plane, and maintains the line dropping for the other planes. Further, if the color tone priority mode is set, the controller 22 does not adopt the random dropping since the addition of the random dropping may change the color tone. Therefore, the controller 22 also maintains the line dropping set at step S110 for the plane, and displays an alert on the operation unit 26 to notify the user that the nozzle clogging may occur (step S115). In this case, the controller 22 sets a change flag of the sheet transport speed, that is, the printing speed. Thereafter, the controller 22 shifts to the processes of step S107 and subsequent steps in FIG. 2.

Figure 4:
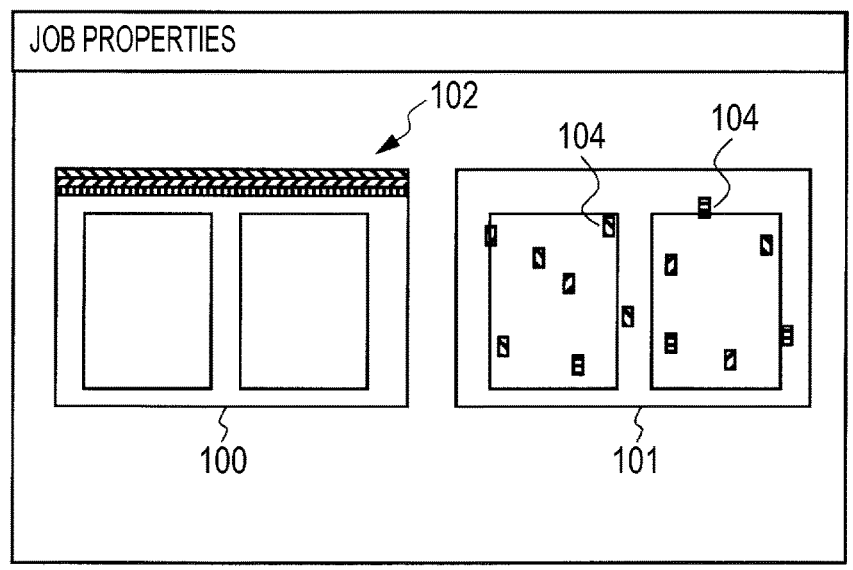
FIG. 4 is a diagram illustrating a screen of the exemplary embodiment.

FIG. 4 illustrates an example of a screen displayed on the terminal apparatus 10 at step S109. Since the controller 22 sets the preliminary discharge method in sheet units, the preliminary discharge method set in sheet units is displayed. For example, the sheets 100 and 101 are displayed as job properties, with the preliminary discharge method illustrated for each of the sheets 100 and 101. The drawing illustrates that the component elements of the sheet 100 are determined as imagers/graphics and set with the line drops 102, and that the component elements of the sheet 101 are determined as text and set with the random drops 104.

Figure 5:
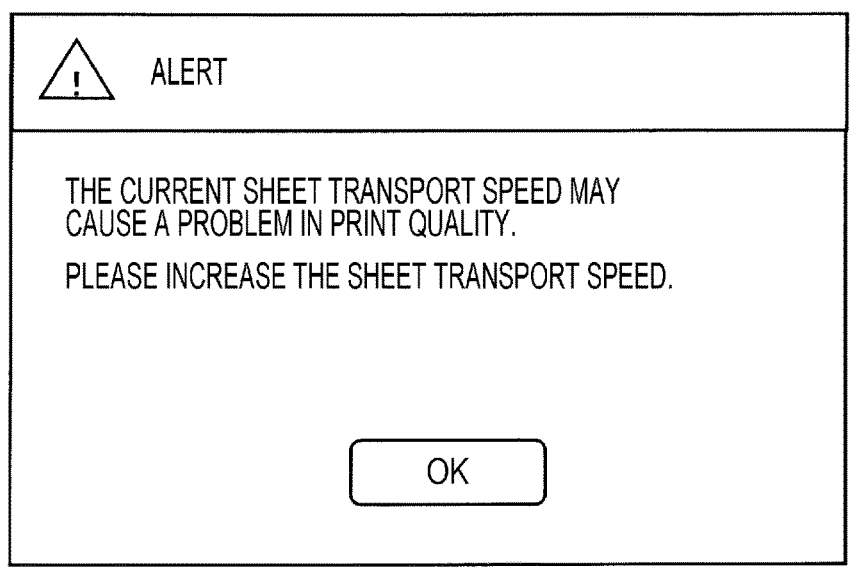
FIG. 5 is a diagram illustrating display of an alert the exemplary embodiment.

FIG. 5 illustrates an example of the alert displayed on the operation unit 26 at step S115. As the alert, a message is displayed which reads "THE CURRENT SHEET TRANSPORT SPEED MAY CAUSE A PROBLEM IN PRINT QUALITY. PLEASE INCREASE THE SHEET TRANSPORT SPEED." The user visually observes this alert, and performs an operation of increasing the sheet transport speed. If the user performs the operation of increasing the sheet transport speed, the controller 22 clears the change flag of the printing speed set at step S115, and performs printing (executes the preliminary discharge in accordance with the line dropping method) at the printing speed changed to a higher value.

Second Setting Process

Figure 6:
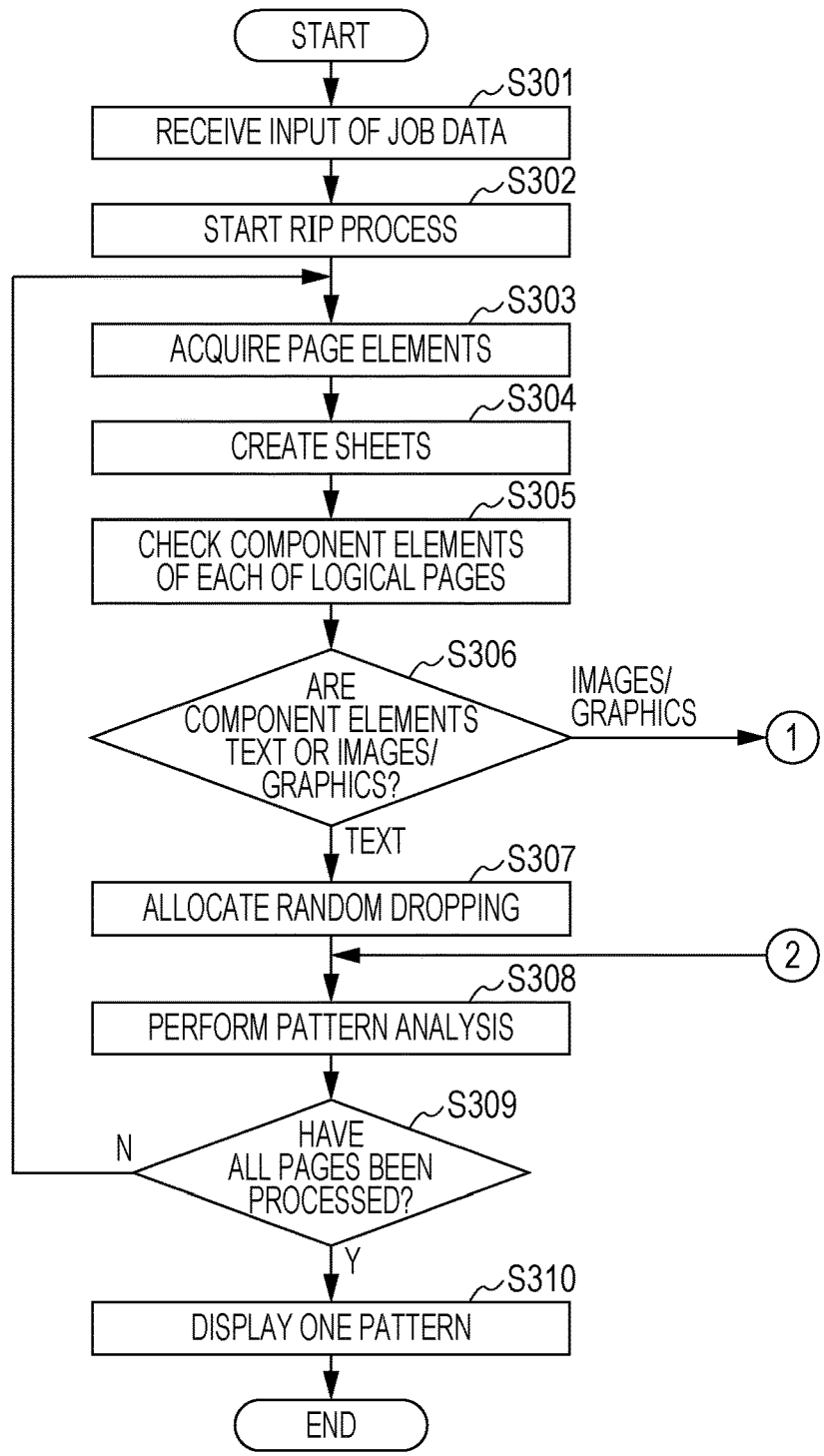
FIG. 6 is a process flowchart of another exemplary embodiment.

FIG. 6 illustrates a flowchart of a second setting process of the preliminary discharge performed by the controller 22.

The controller 22 first receives the input of the print job data from the terminal apparatus 10 (step S301), generates the intermediate data, and starts generating the drawing data (a raster image processor (RIP) process) (step S302).

The controller 22 then acquires elements (objects) forming pages from the generated drawing data (raster data) (step S303), and creates sheets (at S304).

After creating the sheets, the controller 22 checks, for each of the logical pages forming the sheets, whether the component elements the logical page are text or images/graphics (step S305), and determines whether the component elements of the sheet are text or images/graphics in accordance with the result of the checking (step S306). For example, if one sheet is formed of two pages, the determination of whether the component elements are text or images/graphics is performed on each of the two pages. If the component elements are all text over the two pages, the controller 22 determines the component elements of the sheet as text. If the component elements are all images/graphics over the two pages, the controller 22 determines the component elements of the sheet as images/graphics. Further, if the component elements are images/graphics in at least one of the two pages, the controller 22 determines the component elements of the sheet as images/graphics. It is to be noted that, while the determination is performed on the plural pages forming a sheet in the first setting process, the determination is performed on each of the plural pages forming a sheet, and in accordance with the result of this determination, whether the component elements of the sheet are text or images/graphics is determined in the second setting process.

If having determined the component elements of the sheet as text, the controller 22 sets the preliminary discharge method for the sheet by allocating the drop pattern of the random dropping to the sheet (step S307). After setting the random dropping, the controller 22 performs pattern analysis on each of the sheets (step S308). The controller 22 executes the above-described processes on all of the pages (step 309). If there is any page yet to be processed, the controller 22 repeats the processes of step S303 and subsequent steps. After completing the processes on all of the pages, the controller 22 displays one pattern (one sheet) on the terminal apparatus 10 to present the pattern to the user (step S310).

Meanwhile, if having determined the component elements of the sheet as images/graphics, the controller 22 shifts to the aforementioned process of FIG. 3.

Third Setting Process

In the first and second determination processes, whether the component elements are or images/graphics is determined in sheet units, and the preliminary discharge method is set to switch between the line dropping, the random dropping, and the combination of the line dropping and the random dropping in sheet units. In a third determination process, whether the component elements are text or mages/graphics is determined in logical page units as necessary and appropriate, and the preliminary discharge method is set to switch in logical page units.

Figure 7:
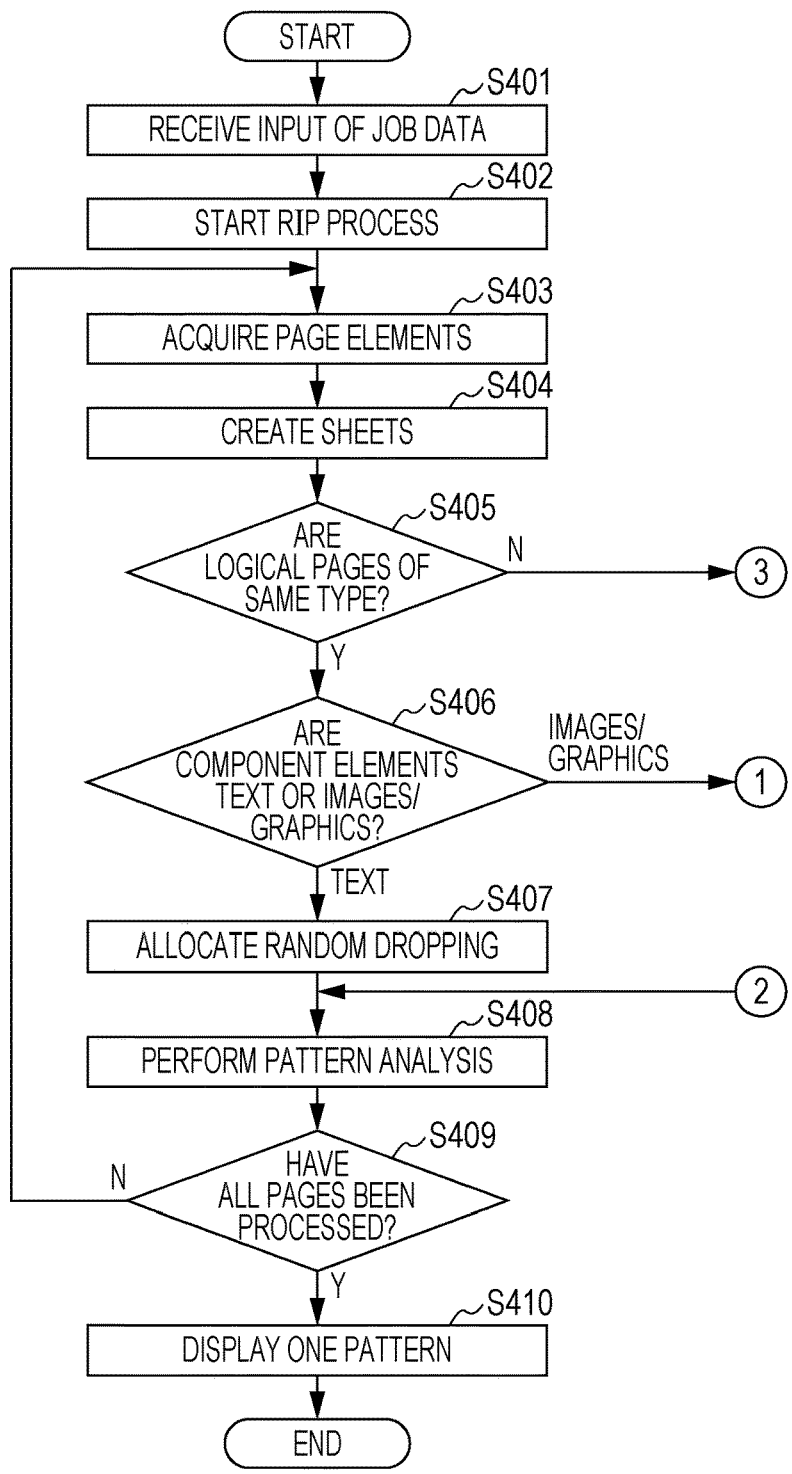
FIG. 7 is a first part of a process flowchart of still another exemplary embodiment.
Figure 8:
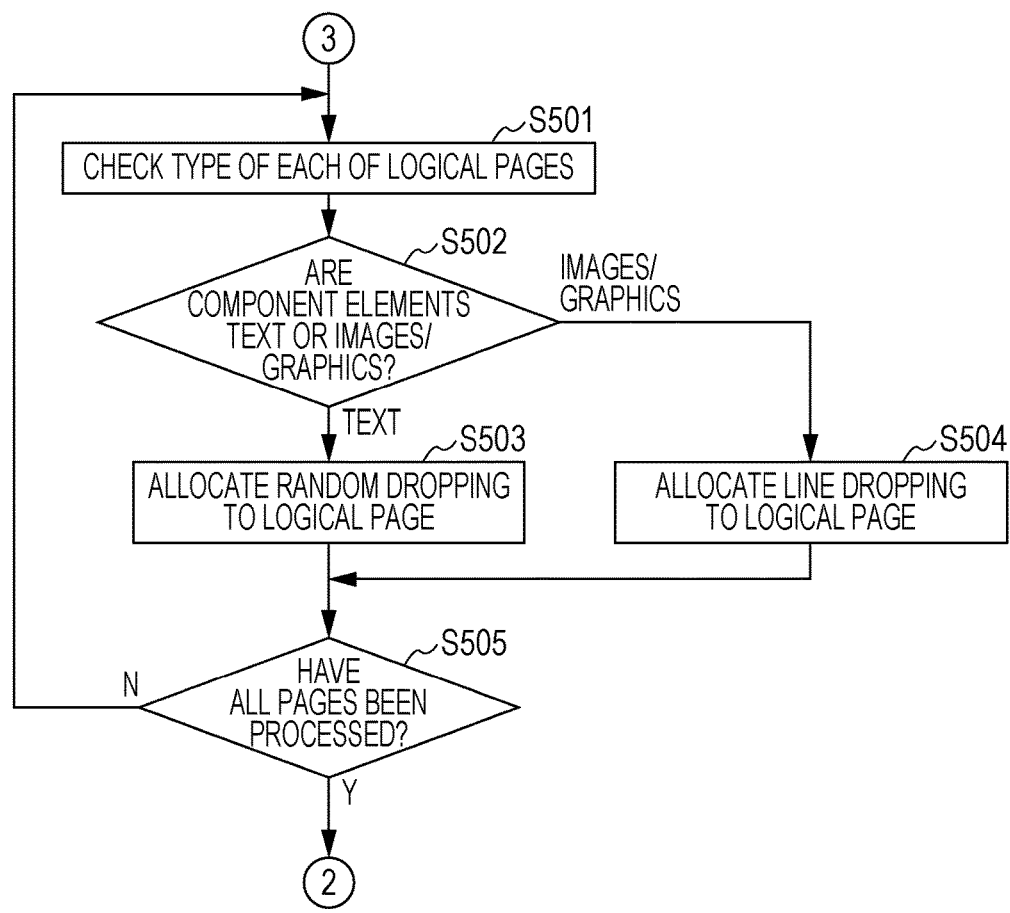
FIG. 8 is a second part of the process flowchart of the still another exemplary embodiment.

FIGS. 7 and 8 illustrate a flowchart of the third setting process of the preliminary discharge performed by the controller 22.

In FIG. 7, the controller 22 first receives the input of the print job data from the terminal apparatus 10 (step S401), generates the intermediate data, and starts generating the drawing data (a raster image processor (RIP) process) (step S402).

The controller 22 then acquires elements (objects) forming pages from the generated drawing data (raster data) (step S403), and creates sheets (step S404).

After creating the sheets, the controller 22 determines whether or not the logical pages forming each of the sheets are of the same type (step S405).

If the logical pages forming the sheet are of the same type, it is favorable to set the preliminary discharge in sheet units. Thus, the controller 22 determines whether the component elements are text or images/graphics in sheet units (step S406). Processes subsequent thereto are similar to the processes of step S106 and subsequent steps in FIG. 2 (steps S407 to S410).

If the logical pages forming the sheet are not of the same type, that is, if one of the two pages is of the text type and the remaining one of the two pages is of the image/graphic type, the controller 22 shifts to the process of FIG. 8.

In FIG. 8, the controller 22 checks the type of each of the logical pages (step S501), and determines whether the component elements of the logical page are text or images/graphics (step S502). If the component elements of the logical page are text, the controller 22 sets the preliminary discharge method for the logical page by allocating the drop pattern of the random dropping to the logical page (step S503). If the component elements of logical page are images/graphics, the controller 22 sets the preliminary discharge method for the logical page by allocating the drop pattern of the line dropping to the logical page (step S504). The controller 22 repeatedly executes the above-described processes on all of the pages (step S505).

In sum, in the third setting process, the controller 22 first checks whether or not the respective types of the logical pages forming each of the sheets match, and sets the preliminary discharge method in sheet units if the types match, or sets the preliminary discharge method in logical page units if the types do not match. The third setting process is particularly favorable in a case in which text and images/graphics are mixed in the print job, and the shift between the text and the images/graphics occurs in each of the logical pages. It is to be noted that, in the third setting process, the preliminary discharge method may be set in sheet units in some cases and be set in logical page units in other cases. For example, when the preliminary discharge method is set in logical page units, the line dropping is set for a logical page with a high proportion of images/graphics, and the random dropping is set for a logical page with a high proportion of text. Further, the line dropping is set for a logical page containing plural images, and the random dropping is set for a substantially blank logical page.

Figure 9:
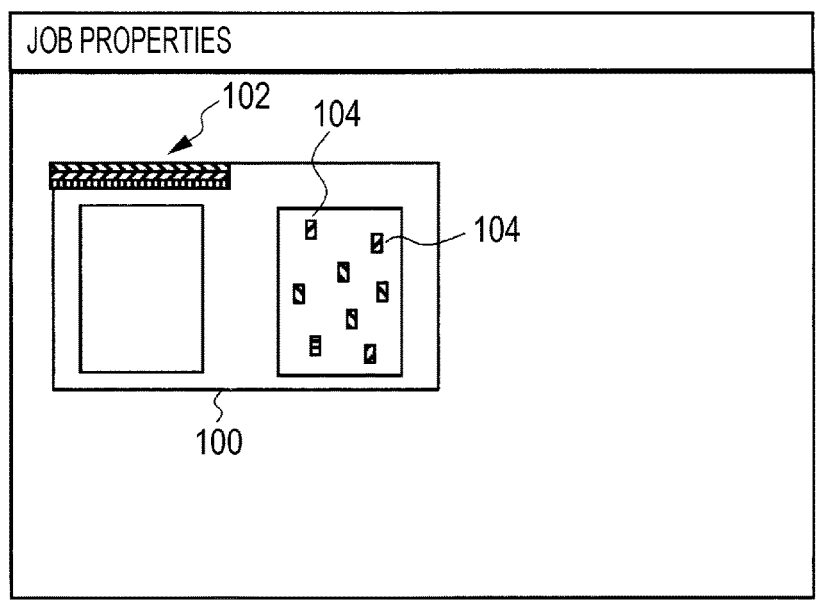
FIG. 9 is a diagram illustrating a screen of the still another exemplary embodiment.

FIG. 9 illustrates an example of the pattern displayed on the terminal apparatus 10 at step S410. This is a case in which the logical pages forming a sheet are of different types, and thus the preliminary discharge method is set in logical page units. One of the two logical pages forming the sheet 100 is set with the line drops 102, and the other one of the two logical pages forming the sheet 100 is set with the random drops 104. By visually observing this screen, the user is capable easily understanding that the preliminary discharge method changes in each of the logical pages and which type of preliminary discharge is to be per formed on which one the logical pages.

Fourth Setting Process

In the first to third setting processes, if the line dropping is set, the maximum ejection interval is further calculated for each of the planes with the sheet transport speed, and is compared with the threshold of the nozzle clogging. Then, if the maximum ejection interval exceeds the threshold in any of the planes, the preliminary discharge method is switched and set to the combination of the line dropping and the random dropping from the line dropping only for the plane. In the C, M, Y, and K planes, the K plane in particular may substantially affect the color tone. Only when the maximum ejection interval exceeds the threshold in the K plane, therefore, the alert that suggests increasing the sheet transport speed may be displayed without the switching and setting of the preliminary discharge method to the combined method of the line dropping and the random dropping from the line dropping.

Figure 10:
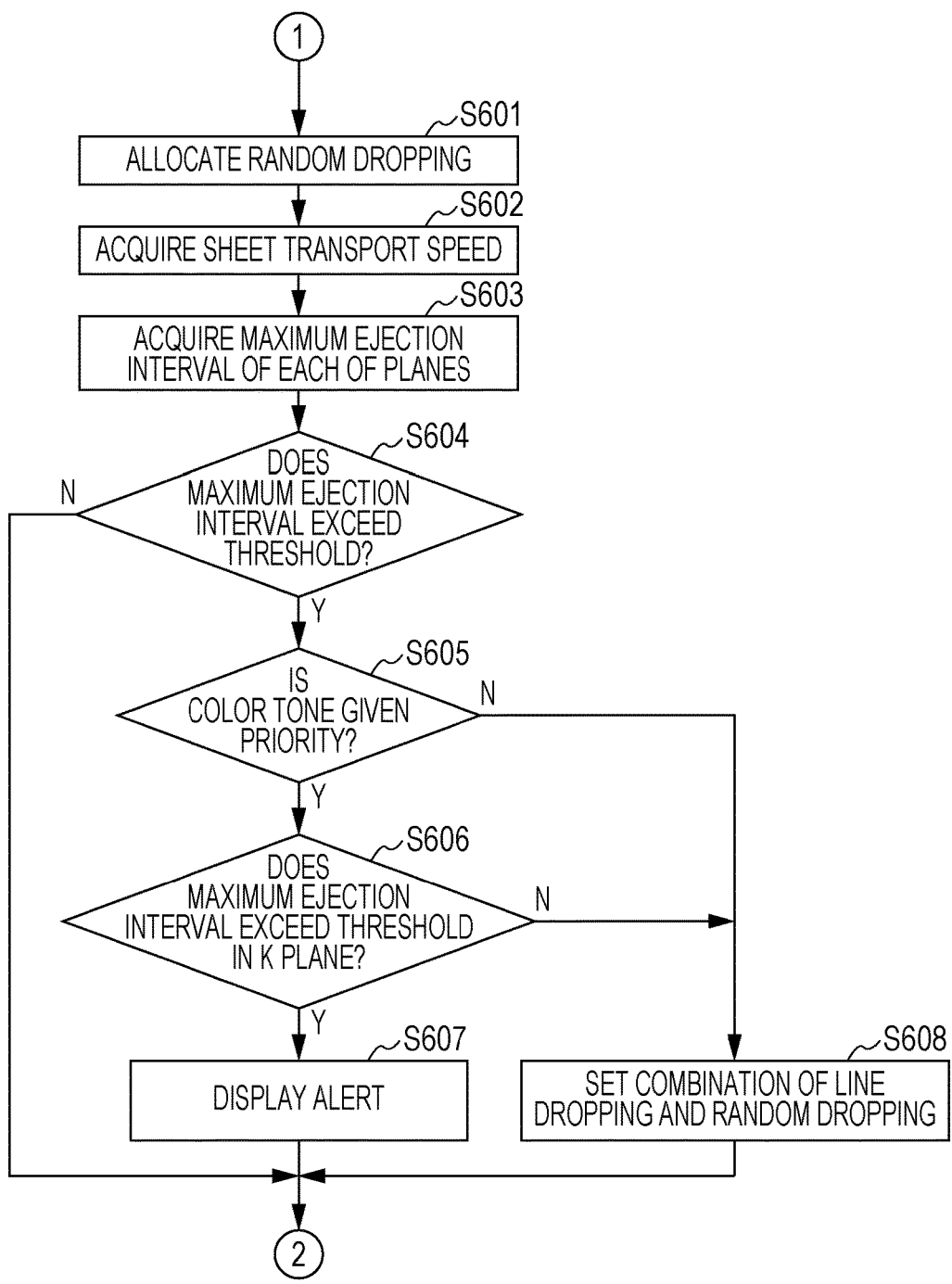
FIG. 10 is a process flowchart of still yet another exemplary embodiment.
Figure 11A:
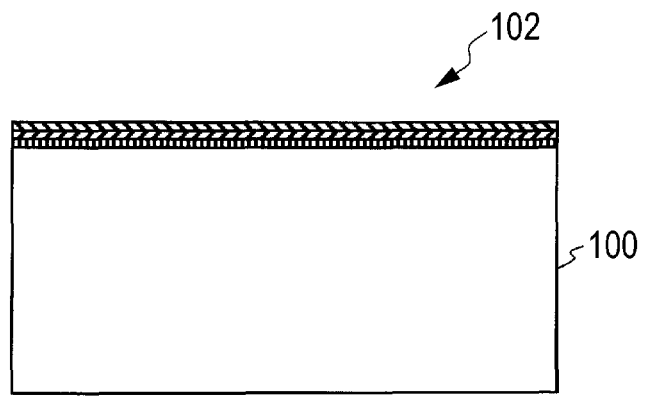
FIGS. 11A and 11B are diagrams illustrating line dropping and random dropping.
Figure 11B:
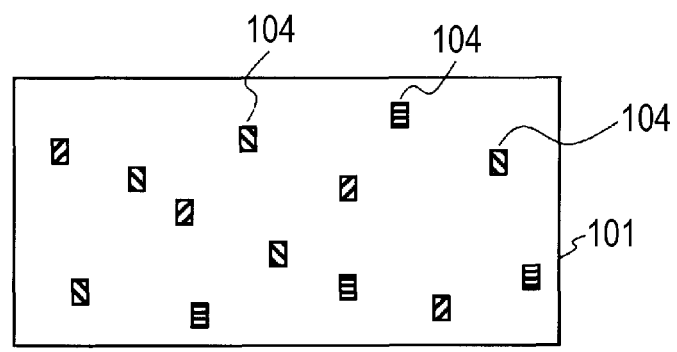

FIG. 10 illustrates a flowchart of a fourth setting process, which corresponds to the part of the process flowchart of the first setting process in FIG. 3.

In FIG. 10, the controller 22 sets the preliminary discharge method for the sheet by allocating the drop pattern of the line dropping to the sheet (step S601).

After setting the line dropping for the sheet, the controller 22 further acquires the sheet transport speed of the printing unit 28 (step S602), and calculates the maximum ejection interval for each of the C, M, Y, and K plates planes) with the sheet transport speed (step S603). The maximum ejection interval of each of the planes represents the non-discharge time of the plane. The controller 22 compares the non-discharge time of each of the planes with the corresponding threshold of the nozzle clogging, and determines whether or not the non-discharge time exceeds threshold (step S604).

If the non-discharge time exceeds the threshold in any of the planes, the controller 22 further determines whether or not the color tone priority mode is set (step S605). If the color tone priority mode is not set, the controller 22 sets the combined method of the line dropping and the random dropping as the preliminary discharge method for the plane (step S608).

If the color tone priority mode is set, the controller 22 further determines whether or not it is in the K plane that the non-discharge time exceeds the threshold (step S606). If it is t in the K plane that the non-discharge time exceeds the threshold, the controller 22 assumes that the influence of the random dropping on the color tone is relatively small, and thus sets the combined method of the line dropping and the random dropping (step S608). Meanwhile, if it is in the K plane that the non-discharge time exceeds the threshold, the controller 22 assumes that the influence of the random dropping on the color tone is relatively large, and thus displays the alert on the operation unit 26 to notify the user that the nozzle clogging may occur, while maintaining the line dropping set at step S601 (step S607). In this case, the controller 22 sets the change flag of the sheet transport speed, that is, the printing speed. Thereafter, the controller 22 shifts to the processes of step S107 and subsequent steps in FIG. 2, to the processes of step S308 and subsequent steps in FIG. 6, or to the processes of step S408 and subsequent steps in FIG. 7.

The description has been given of exemplary embodiments of the present invention. The present invention, however, is not limited to these exemplary embodiments, and may be modified in various ways.

For example, in one of the present exemplary embodiments, whether the component elements are text or images/graphics is determined at step S105 in FIG. 2. However, it may simply be determined whether the component elements are text or graphics, with the images and graphics integrated together. In this case, the images are included in the graphics.

Determination criteria for determining whether the component elements are text or graphics are exemplified as follows.

When Making Determination in Sheet Units

The component elements are determined as text, if all component elements in the sheet are text.

The component elements are determined as graphics, if all component elements in the sheet are graphics.

The component elements are determined as text, if the ratio of text in the sheet equals or exceeds a corresponding threshold, which is a constant value such as 50%, 70%, or 90%.

The component elements are determined as graphics, if the ratio of graphics in the sheet equals or exceeds a corresponding threshold, which is a constant value such as 10% or 30%.

When Making Determination in Logical Page Units

The component elements are determined as text, if all component elements in the logical page are text.

The component elements are determined as graphics, if all component elements in the logical page are graphics.

The component elements are determined as text, if the ratio of text in the logical page equals or exceeds a corresponding threshold.

The component elements are determined as graphics, if the ratio of graphics in the logical page equals or exceeds a responding threshold.

These determination criteria may be used in combination as appropriate. For example, if the ratio of text in the sheet is 80%, exceeding the corresponding threshold, and if the ratio of graphics in the sheet is 20%, exceeding the corresponding threshold, the component elements may be determined as graphics, with priority given to the ratio of graphics exceeding the corresponding threshold.

Combinations of these determination criteria and the preliminary discharge methods are exemplified by, but not necessarily limited to, the following examples determined in sheet units.

The preliminary discharge method is set to the random dropping, if all component elements in the sheet are text.

The preliminary discharge method is set to the random dropping, if the ratio of text in the sheet equals or exceeds the corresponding threshold.

The preliminary discharge method is set to the line dropping, if all component elements in the sheet are graphics.

The preliminary discharge method is set to the line dropping, if all component elements in the sheet are graphics, and none of the maximum ejection intervals of all nozzles exceeds the corresponding threshold.

The preliminary discharge method is set to the combination of the line dropping and the random dropping, if all component elements in the sheet are graphics, and any of the maximum ejection intervals of the nozzles exceeds the corresponding threshold.

The preliminary discharge method is set to the line dropping, if all component elements in the sheet are graphics, and the maximum ejection interval of the nozzles for black exceeds the corresponding threshold.

The preliminary discharge method is set to the line dropping, if all component elements in the sheet are graphics, any of the maximum ejection intervals of the nozzles exceeds the corresponding threshold, and the color tone priority mode is set.

The preliminary discharge method is set to the combination of the line dropping and the random dropping, if the ratio of graphics in the sheet equals or exceeds the corresponding threshold, and any of the maximum ejection intervals of the nozzles exceeds the corresponding threshold.

Further, in the present exemplary embodiments, when the component elements are graphics and the drop pattern of the line dropping is allocated, the preliminary discharge method is switched between the line dropping and the combination of the line dropping and the random dropping in consideration of the sheet transport speed, that is, the maximum ejection interval of each of the nozzles. If there is a low possibility of the nozzle clogging due to a sufficiently high sheet transport speed, however, the preliminary discharge may be executed with the drop pattern of the line dropping allocated, without consideration of the maximum ejection interval of each of the nozzles.

Further, in the present exemplary embodiments, the alert is displayed if the color tone priority mode is set, and the combination of the line dropping and the random dropping is set if the color tone priority mode is not set. If whether or not the color tone priority mode is set is unknown (including a case in which there is no such mode setting), the combination of the line dropping and the random dropping may be set with priority given to the prevention of the nozzle clogging.

Further, in the present exemplary embodiments, when whether or not the color tone priority mode is set is determined, the preliminary discharge method may be determined in accordance with the ratio of graphics in a sheet unit or in a logical page unit. That is, for example, if the component elements are determined as graphics but the ratio of the graphics is relatively small, the preliminary discharge method may be set to the combination of the line dropping and the random dropping even if the color tone priority mode is set, on the assumption that a change in color tone has small influence on the entire outcome.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a drawing data creating unit that creates drawing data from a print job; and
   a controller that automatically chooses between a first dropping method of performing discharge in a drawing area and a second dropping method of performing the discharge outside the drawing area as a preliminary discharge method in accordance with a ratio between text and graphics as component elements of the created drawing data, and performs preliminary discharge in accordance with the set preliminary discharge method.

2. The image forming apparatus according to claim 1, wherein if the component elements of the drawing data are text, the controller automatically sets the first dropping method as the preliminary discharge method.

3. The image forming apparatus according to claim 1, wherein the controller automatically sets, in sheet units, at least one of the first dropping method and the second dropping method as the preliminary discharge method.

4. The image forming apparatus according to claim 1, wherein the controller automatically sets, in logical page units, at least one of the first dropping method and the second dropping method as the preliminary discharge method.

5. The image forming apparatus according to claim 1, wherein if the component elements of the drawing data are graphics, the controller automatically sets the second dropping method as the preliminary discharge method.

6. The image forming apparatus according to claim 5, wherein if the component elements of the drawing data are the graphics, the controller automatically sets the second dropping method or a combination of the second dropping method and the first dropping method in accordance with a sheet transport speed.

7. The image forming apparatus according to claim 6, wherein if a color tone priority mode is set, the controller automatically sets the second dropping method, and outputs an alert that suggests increasing the sheet transport speed.

8. The image forming apparatus according to claim 6, wherein when the second dropping method is automatically set as the preliminary discharge method, the controller maintains the automatically set second dropping method if none of maximum ejection intervals of nozzles for respective colors exceeds a threshold, and the controller automatically sets the combination of the second dropping method and the first dropping method if at least one of the maximum ejection intervals of the nozzles for the respective colors exceeds the threshold.

9. The image forming apparatus according to claim 8, wherein the respective colors include a black color, and
wherein if the maximum ejection interval of the nozzles for the black color exceeds the threshold, and if a color tone priority mode is set, the controller maintains the automatically set second dropping method, and outputs an alert that suggests increasing the sheet transport speed.

10. A non-transitory computer readable medium storing a program causing a computer to execute a process for forming an image, the process comprising:
creating drawing data from a print job;
automatically choosing between a first dropping method of performing discharge in a drawing area and a second dropping method of performing the discharge outside the drawing area as a preliminary discharge method in accordance with a ratio between text and graphics as component elements of the created drawing data; and
performing preliminary discharge in accordance with the set preliminary discharge method.

11. An image forming method comprising:
creating drawing data from a print job;
automatically choosing between a first dropping method of performing discharge in a drawing area and a second dropping method of performing the discharge outside the drawing area as a preliminary discharge method in accordance with a ratio between text and graphics as component elements of the created drawing data; and
performing preliminary discharge in accordance with the set preliminary discharge method.

* * * * *